Patented May 16, 1944

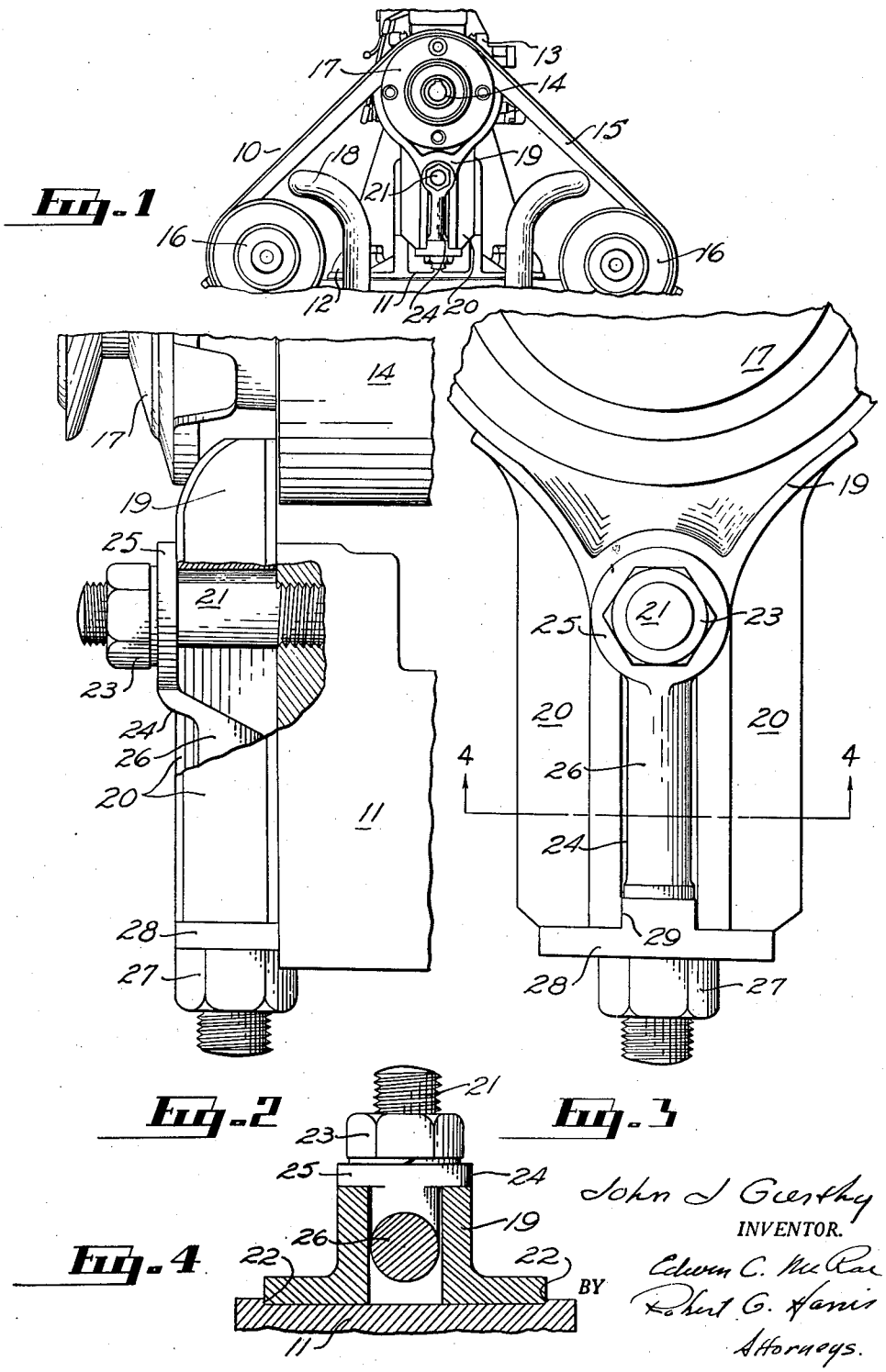

2,349,231

UNITED STATES PATENT OFFICE 2,349,231

ENGINE CONSTRUCTION

John J. Gierthy, Detroit, Mich.

Application August 12, 1942, Serial No. 454,582

4 Claims. (Cl. 74—242.13)

This invention relates to automotive engines; and, more particularly, to a fan belt and generator adjustment to be used in such engines.

Provision is usually made in automotive engines for the belt drive of a cooling fan directly from the engine crankshaft or a drive shaft operated from it. This belt drive may be extended, where desired, to drive other engine auxiliaries, such as generator, water pumps, etc. It is essential that the belt be kept at proper tension at all times to insure the necessary driving conditions and the operation of the various accessories driven by it. Obviously, the effective length of the belt may vary, due to wear or other conditions, and some form of adjustment must be included to make up for the differences in effective length. Failing this, the belt, under the least serious conditions, will operate noisily; and, as it becomes progressively looser, the cooling system may fail to function properly, with attendant damage to the engine and its components.

Ordinarily, the proper degree of tension at which the belt should be maintained is indicated by the transverse play in it and means of one sort or another are provided to move the co-operating pulleys to tighten or loosen the belt accordingly. However, heretofore these means have not been subject to precise adjustment and, coupled with the limited quarters in which the mechanism is contained, it has not been possible to obtain the precise adjustment which will insure the operation of the components without a great deal of effort.

An advantage of this invention is that it affords a precise location of one of the components of the belt system, thereby permitting a precise adjustment in the effective length of the belt. Moreover, this adjustment is made readily accessible, even in the most restricted quarters. Yet another advantage is that the device can be self-contained and takes up no further room but utilizes the existing structure and is fitted in with it, without interfering with any other function of the engine.

Another advantage of the structure is in the extreme economy of its manufacture and installation and the fact that it may be applied to existing engines without any change therein. It is economical to manufacture since it has but three component parts, none of which is complicated. Still another advantage is that not only does it permit an adjustment of one of the components of the belt system but positively secures it in the adjusted position, a feature which was lacking under the prior methods of adjustment.

With these and other objects in view, the invention consists in the arrangement, construction and combination of the various parts of the improved device as described in the specification, claimed in the claims, and illustrated in the accompanying drawing in which:

Figure 1 is a partial front view of an engine in which the device of this invention is attached.

Figure 2 is a side view of the device on a larger scale, portions of the adjacent engine structure being shown in section.

Figure 3 is a front view of the device corresponding to that shown in Figure 2.

Figure 4 is a section of the device taken on the line 4—4 of Figure 3.

Referring now to Figure 1, the device is shown attached to a V-type engine 10, in which the block 11, the manifold 12, the air cleaner and carburetor 13 and the generator 14 are shown. In this view, the fan and primary drive of the belt 15 are not shown but it will be understood that these elements, as customary in this type of engine, are disposed adjacent the lower portion thereof and that the belt 15 engages these components, completing its driving cycle. In the present case, the belt 15 passes over the two water-pump pulleys 16 and the generator pulley 17, driving these elements as well as the fan previously referred to. The effective length of the belt is varied by moving the generator 14 vertically. In the normal construction, the generator has a combined face plate and bracket 19 to which the generator body is bolted and which has an extending fork 20 fitted over a stud 21 in the engine block and guided, for vertical movement, in a channel 22 set in the block. Thus, the bracket may slide vertically with respect to the engine and the nut 23 of the stud 21 then may be tightened into position to frictionally engage the bracket and hold it in the selected position. When this form of adjustment is used, the nut 23 is loosened to permit the bracket to slide and the entire generator is then lifted until the desired tension is obtained on the belt, at which point the nut is retightened. The difficulty with this is that as the nut is loosened, the generator, which has considerable weight, immediately slides downwardly to its lowest position. It is then usually necessary to apply a pry bar or something similar underneath it to pry it into the approximate upper position desired, to determine whether the tension is proper at that point or not and then to tighten the bolt to maintain it in the selected position. Obviously, no very fine adjustment is obtainable in this way and, moreover, the generator is held in a selected position only by the frictional purchase of the nut.

To avoid this, the present invention makes use of a hanger bolt 24, the head 25 of which is preferably offset from the body and is provided with an aperture normal to the longitudinal axis of the bolt and designed to slip over the stud 21. The shank 26 of the bolt is threaded and receives the nut 27. Slidably engaged on the shank 26 is a carrier 28 which engages the lower end of the fork 20.

The operation of the device will be apparent from the foregoing. The upper end of the hanger bolt 24 is slipped over the stud 21 and, due to the offset between the head 25 and shank 26, the shank is seated in the space between the arms of the fork 20. The carrier 28 may then be slipped over the shank 26 and the hanger nut 27 screwed on and engaged with the carrier. The carrier has an offset shoulder 29 which fits snugly between the arms of the fork 20 and prevents any rotation of the carrier as the nut is screwed up. The stud nut 23 may then be re-engaged with the stud 21 but instead of being relied upon to maintain the generator at the proper adjustment, it now merely secures the hanger bolt at the proper location. When it is desired to change the vertical position of the generator, the hanger nut 27 need only be screwed up or down, as the case may be, and the vertical position of the generator will be changed accordingly without any undue effort. Moreover, when this precise adjustment is obtained it will be maintained positively due to the structure of the hanger bolt and is not dependent upon the frictional engagement between the stud bolt and the yoke, as heretofore.

The advantage of this device will be readily appreciated by those who have struggled with a recalcitrant generator and attempted to seesaw it into the desired position at the expense of muscle and temper. Often when its adjustment has been so obtained, the frictional engagement of the said nut was found insufficient to maintain it there during operation and readjustment was required at frequent intervals. The evident economy of this device and its ease of application must also be noted, since it consists of but three parts—the hanger bolt, carrier and nut. It can also be attached to any of the existing structures in less time than an adjustment could be effected in the ordinary, previously used way. Moreover, by so constructing the hanger nut that it is received within the yoke cavity, there is no interference with the mechanism previously attached to the engine and at the same time the device is readily accessible for operation.

While this is shown on a V-type motor of a particular construction, it will be understood that it can be utilized in such other types as make similar provision for belt adjustment. As such, it is not limited in application to the generator itself, but may be applied to similar pulleys and used to drive other accessories in other positions.

Some changes may be made in the arrangement, construction and combination of the various parts of the improved device without departing from the spirit of the invention and it is the intention to cover by the claims such changes as may reasonably be included within the scope thereof.

I claim as my invention:

1. An internal-combustion engine having belt-driven accessories thereon, at least one of said accessories being movable with respect to said engine to vary the effective driving length of said belt, a support in said engine, a bracket for said movable accessory having a fork engaging said support and extending therebeyond, a hanger bolt engaging said support at one end and said bracket at the other end, said hanger bolt having an enlarged head bearing on the outer surface of said fork and an offset shank disposed within said fork, and threaded means on said hanger bolt to move said bracket with respect to said support.

2. An internal-combustion engine having belt-driven accessories, one of said accessories being movable with respect to said engine to vary the effective driving length of said belt, a bracket plate upon which said movable accessory is secured, a stud on said engine, said bracket having extending forks and said stud being received therebetween and extending therebeyond, a hanger bolt having an offset head portion engaging said stud and a shank portion received within said fork, carrier means slidably mounted on said hanger bolt and engaging the lower end of said fork, threaded means in the lower part of said hanger bolt and engaging said carrier to vary the relative positions of said stud and bracket.

3. In a generator fan-belt adjustment, an engine, a stud thereon, a forked generator bracket slidably received on said engine and engaging said stud, a generator secured to said bracket and having a pulley extending therefrom, a belt engaging said pulley, a hanger bolt engaging said stud outwardly of said bracket, at least a portion of said bolt received between the forks of said bracket, a carrier slidably mounted on said hanger bolt and engaging the lower end of said bracket, threaded means positioned at the lower portion of said hanger bolt engaging said carrier to change the relative position of said bracket with respect to said stud.

4. In an internal-combustion engine, a belt adjustment comprising, a stud on said engine, a generator bracket having extending spaced arms encompassing said stud extending therebeneath and slidably received on said engine, a hanger bolt having a shank and a head offset therefrom, an aperture in said head engaging said stud outwardly of said bracket and said shank being received between the extending arms of said bracket, a carrier slidably mounted on said shank and engaging the lower ends of said bracket, threaded means on said shank engaging said carrier and effective to vary the relative positions of said bracket and said stud.

JOHN J. GIERTHY.